United States Patent
Hsieh et al.

(10) Patent No.: US 8,582,690 B2
(45) Date of Patent: Nov. 12, 2013

(54) APPARATUS AND METHOD FOR DETERMINING SIGNAL POWER

(75) Inventors: Ming Yu Hsieh, Hsinchu Hsien (TW); Shih-Chieh Yen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 513 days.

(21) Appl. No.: 12/974,629

(22) Filed: Dec. 21, 2010

(65) Prior Publication Data

US 2011/0158356 A1    Jun. 30, 2011

(30) Foreign Application Priority Data

Dec. 24, 2009 (TW) .............................. 98144730 A (51) Int. Cl.
*H04L 27/12* (2006.01)
*H03K 7/06* (2006.01)
*H03C 3/00* (2006.01)

(52) U.S. Cl.
USPC ........... 375/307; 375/224; 375/327; 375/373; 375/376

(58) Field of Classification Search
USPC .................... 375/307, 224, 327, 373, 376
See application file for complete search history.

(56) References Cited

U.S. PATENT DOCUMENTS

| 2006/0104398 A1* | 5/2006 | Su et al. ........................ 375/376 |
| 2009/0115537 A1* | 5/2009 | Ramaswamy et al. ......... 331/44 |
| 2010/0122106 A1* | 5/2010 | Lee et al. ....................... 713/503 |

FOREIGN PATENT DOCUMENTS

TW        200945791        11/2009

OTHER PUBLICATIONS

Taiwan Intellectual Property Office, "Office Action", Mar. 21, 2013, Taiwan.

* cited by examiner

*Primary Examiner* — Ted Wang
(74) *Attorney, Agent, or Firm* — WPAT, PC; Justin King (57) ABSTRACT

An apparatus for determining signal power comprise an oscillating circuit and a determining circuit. The oscillating circuit generates an oscillating signal. When a to-be-detected signal has signal power greater than a threshold, the oscillating signal has a first frequency; when the signal power is smaller than the threshold, the oscillating signal has a second frequency. The determining circuit determines whether the oscillating signal has either the first frequency or the second frequency, and generates a determination result accordingly.

18 Claims, 10 Drawing Sheets

APPARATUS AND METHOD FOR DETERMINING SIGNAL POWER

CROSS REFERENCE TO RELATED PATENT APPLICATION

This patent application is based on Taiwan, R.O.C. patent application No. 98144730 filed on Dec. 24, 2009.

FIELD OF THE INVENTION

The present invention relates to an apparatus for determining signal power, and more particularly, to an apparatus for determining signal power via injection locking and a method thereof.

BACKGROUND OF THE INVENTION

Figure 1:
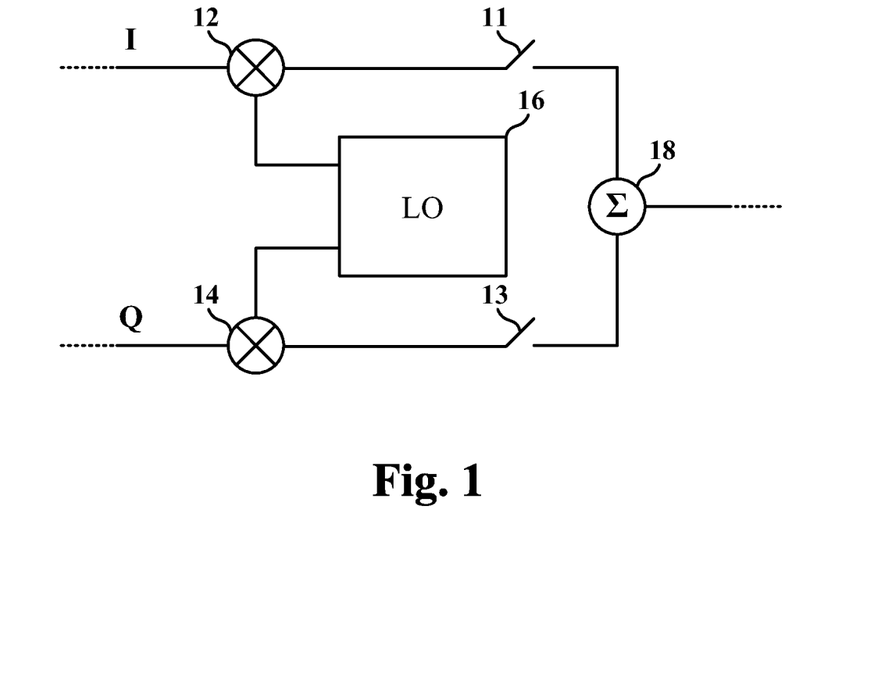
FIG. 1 is a schematic diagram of a conventional signal transmitter.

FIG. 1 shows a conventional signal transmitter having two types of data paths of an in-phase signal I and a quadrature-phase signal Q. Signals of the paths I and Q of the signal transmitter are first respectively processed by a mixer 12 and a mixer 14, and then are modulated by a carrier signal generated by a local oscillator 16. An adder 18 accumulates the two modulated signals. Since un-ideal factors exist in circuits, even when no baseband signals are provided by subsequent circuits to the paths I and Q, noise (so-called carrier leakage) is created at an output end of the adder 18.

In order to avoid negative influences created by the carrier leakage, a power upper limit (e.g., −30 dBm) of a carrier leakage signal is clearly defined in most communication specifications. Therefore, a calibrating circuit for detecting and reducing the carrier leakage is needed at the output end of the signal transmitter. The calibrating circuit commonly comprises a power detector or a mixer-type detector, an analog-to-digital converter (ADC), and a determining circuit.

Taking calibrating the path I as an example, a switch 11 for connecting the path I to the adder 18 is set closed, and a switch 13 for connecting the path Q to the adder 18 is set open. When the carrier leakage power created by the path I at the output end of the signal transmitter is converted to a voltage value by the power detector or the mixer-type detector, the voltage value is converted to a digital value by the ADC. The determining circuit of the calibrating circuit generates an analog calibration signal fed to the path I according to the digital value, and adds direct current (DC) voltages to the calibration signal to reduce signal power of the carrier leakage signal. The determining circuit continuously calibrates the foregoing calibration signal until the signal power of the carrier leakage signal created by the path I is lower than the threshold defined in the specifications. After the calibration of the path I completes, the calibration circuit iterates the foregoing steps to calibrate the path Q.

In addition to the signal transmitter in FIG. 1, most conventional circuits adopt a power detector or a mixer-type detector to measure the signal power. The power detector and the mixer-type detector convert the signal power of a to-be-detected signal to a voltage value, and an input signal of the power detector or the mixer-type detector is directly proportional to an output signal. Therefore, influences on accuracy of a detection result created by un-ideal factors of circuits of the power detector and the mixer-type detector become larger as the input signal power gets smaller. Unless an expensive, accurate power detector or mixer-type detector is utilized, a signal having low power, like the carrier leakage, is rather hard to be accurately detected.

In addition, there are DC errors occurring in the ADC for further converting an output voltage of the power detector or the mixer-type detector to the digital value. Therefore, the conventional power detector regarding the voltage value as a comparing reference value cannot accurately determine the signal power, and may even create calibration errors in subsequent circuits.

SUMMARY OF THE INVENTION

In order to solve the foregoing problems, the present invention provides an apparatus and a method for determining signal power by adopting a frequency as a comparing reference. More specifically, the apparatus and method according to the present invention adopt characteristics of injection locking occurs when an oscillating circuit is interfered by an interference signal having large power, and determines the signal power according to whether the oscillating circuit enters an injection-lock status.

According to an embodiment of the present invention, an apparatus for determining signal power comprises an oscillator and a determining circuit. The oscillator generates an oscillating signal. When a to-be-detected signal has signal power greater than a threshold, the oscillating signal has a first frequency; when signal power is smaller than the threshold, the oscillating signal has a second frequency. The determining circuit determines whether the oscillating signal has the first frequency or the second frequency, and generates a determination result accordingly.

According to another embodiment of the present invention, a method for determining signal power comprises providing a to-be-detected signal to an oscillator, determining whether the oscillating signal has a first frequency or a second frequency, and generating a determination result. Wherein, when signal power of the to-be-detected signal is larger than a threshold, the oscillating signal generated by the oscillator has the first frequency; when the signal power is smaller than the threshold, the oscillating signal has the second frequency.

Compared to the prior art, an apparatus and a method for determining signal power according to the present invention have an advantage of avoiding inaccuracy of determination results created by numerous un-ideal factors of circuits, and are also widely applied to all types of fields needing to detect signal power in addition to a carrier leakage calibration circuit of a signal transmitter. The advantages and spirit related to the present invention can be further understood via the following detailed description and drawings.

DETAILED DESCRIPTION OF THE PREFERRED EMBODIMENT

Generally, without being affected by any interference, an oscillator oscillates at a free running frequency associated with its circuit characteristics. When an interference signal is close to the oscillator and has a frequency approximate to the free running frequency, an output signal of the oscillator may be undesirably affected, and the oscillator may change to oscillate at the frequency of the interference signal instead. In a conventional circuit system, injection locking occurrence due to two adjacent circuit lines that are extremely close to each other is an unwelcomed, negative situation. A circuit designer may increase a distance between the two circuit lines or avoid adopting two approximating frequencies to prevent the foregoing problem.

Apart from the frequency of the interference signal, the injection locking is associated with the signal power of the interference signal. When the injection locking occurs, a relationship between the free running frequency of the oscillator and the frequency of the interference signal can be represented by:

$$\omega_0 - \omega_{inj} \leq \frac{\omega_0}{2Q} \frac{I_{inj}}{I_o}, \quad (1)$$

where $\omega_0$ is the free running frequency of the oscillator, $\omega_{inj}$ is the frequency of the interference signal, Q represents a quality factor of the oscillator, $\omega_{inj}$ is a current amount of the interference signal, and $I_o$ is a current amount of the oscillator. The current amount $I_{inj}$ of the interference signal is directly proportional to the signal power of the interference signal. As seen from Equation 1, when the frequency $\omega_{inj}$ of the interference signal is a constant value, the injection locking more possibly occurs as the signal power of the interference signal gets higher (i.e., the current amount $I_{inj}$ gets larger).

Figure 2:
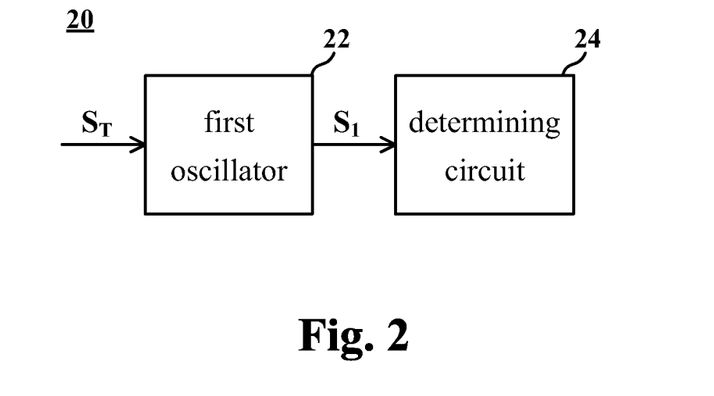
FIG. 2 is a block diagram of an apparatus for determining signal power in accordance with a first embodiment of the present invention.

According to a first embodiment of the present invention, an apparatus for determining signal power adopts characteristics that injection locking may occur in an oscillator to determine whether signal power of an interference signal is greater than a certain threshold. FIG. 2 is a schematic diagram of an apparatus for determining signal power in accordance with a first embodiment of the present invention. In this embodiment, an apparatus 20 for determining signal power comprises a first oscillator 22 and a determining circuit 24. A signal $S_T$ is a to-be-detected signal, and a signal $S_1$ represents an oscillating signal generated by the first oscillator 22. In FIG. 2, the signal $S_T$ is connected to the first oscillator 22 for illustration purposes, and in practice, the signal $S_T$ is connected to or near to an output end, for generating the oscillating signal $S_1$, of the first oscillator 22, so that injection locking occurs in the first oscillator 22—such a modification is also applied to the apparatus for determining signal power according to the present invention.

The first oscillator 22 can be an injection-lock oscillator, and the signal $S_T$ is regarded as an interference signal. A current amount $I_{inj}$ of the signal $S_T$ is directly proportional to its signal power. The foregoing Equation 1 may be rewritten as:

$$I_{inj} \geq \frac{2Q}{\omega_0} \cdot I_o \cdot (\omega_0 - \omega_{inj}), \quad (2)$$

In this embodiment, the frequency $\omega_{inj}$ of the signal $S_T$ is known. According to Equation 2 and the threshold for determining the signal power of the signal $S_T$, the circuit designer can determine the quality factor Q, the current amount $I_o$ and the free running frequency $\omega_0$ of the first oscillator 22. In other words, the circuit designer can control the threshold for determining the signal power of the signal $S_T$ according to the quality factor Q, the current amount $I_o$ and the free running frequency $\omega_0$ of the first oscillator 22.

When the signal power of the signal $S_T$ is greater than the threshold, injection locking occurs in the first oscillator 22 that oscillates at the frequency $\omega_{inj}$ of the signal $S_T$. Otherwise, when the signal power of the signal $S_T$ is smaller than the threshold, the first oscillator 22 oscillates at the free running frequency $\omega_0$. Therefore, the determining circuit 24 can determine whether the signal power of the signal $S_T$ is greater than the threshold according to the oscillating signal $S_1$ having the frequency $\omega_{inj}$ (i.e., a first frequency in the following description) or the frequency $\omega_0$ (i.e., a second frequency in the following description).

Figure 3:
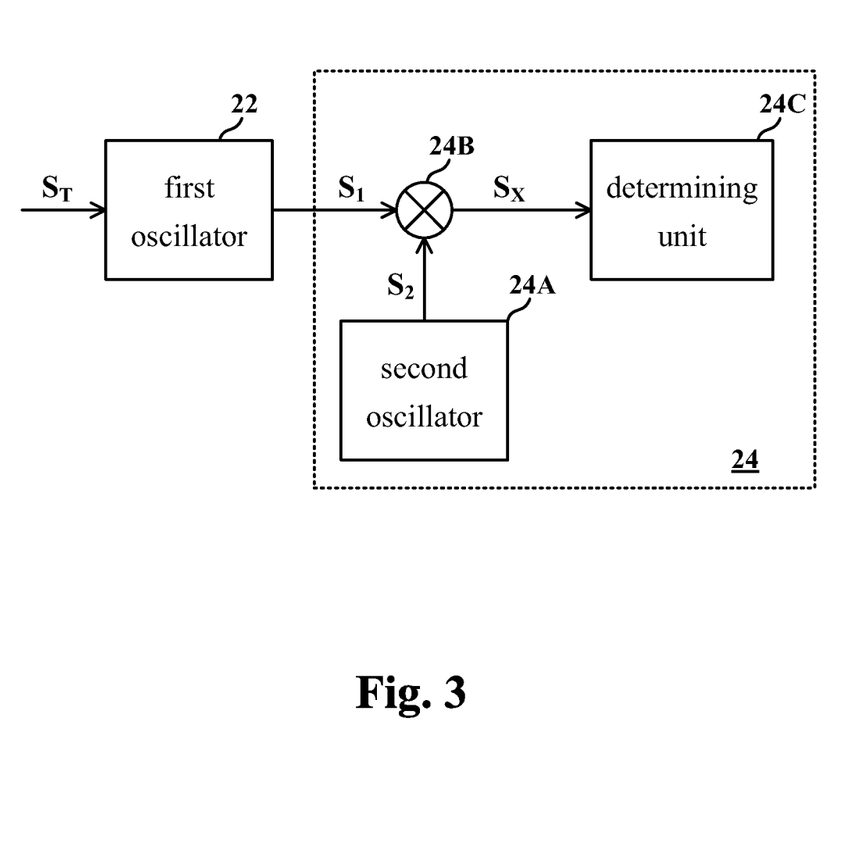
FIG. 3 and FIG. 4 are schematic diagrams of examples of a determining circuit in accordance with the first embodiment of the present invention in FIG. 2.

FIG. 3 shows a detailed example of the determining circuit 24. In this example, the determining circuit 24 comprises a second oscillator 24A, a mixer 24B, and a determining unit 24C. The second oscillator 24A provides a second oscillating signal $S_2$. The mixer 24B mixes the first oscillating signal $S_1$ and the second oscillating signal $S_2$ to generate a mixed signal $S_X$. The determining unit 24C determines that the first oscillating signal $S_1$ has the first frequency $\omega_{inj}$ or the second frequency $\omega_0$ according to the mixed signal $S_X$.

For example, the second oscillating signal $S_2$ is set as having the first frequency $\omega_{inj}$. When the first oscillating signal $S_1$ and the second oscillating signal $S_2$ both have the first frequency $\omega_{inj}$, an output result of the mixer 24B comprises signals having two different frequencies of $\omega_{inj}$ and $2\omega_{inj}$ and a DC signal. When the first oscillating signal $S_1$ has the second frequency $\omega_0$, and the second oscillating signal $S_2$ has the first frequency $\omega_{inj}$, the output result of the mixer 24B respectively comprises signals having four different frequencies of $\omega_0$, $\omega_{inj}$, ($\omega_{inj}+\omega_0$), and ($\omega_{inj}-\omega_0$). Therefore, if the mixed signal $S_X$ comprises the DC signal, the determining unit 24C determines the first oscillating signal $S_1$ has the first frequency $\omega_{inj}$.

Figure 4:
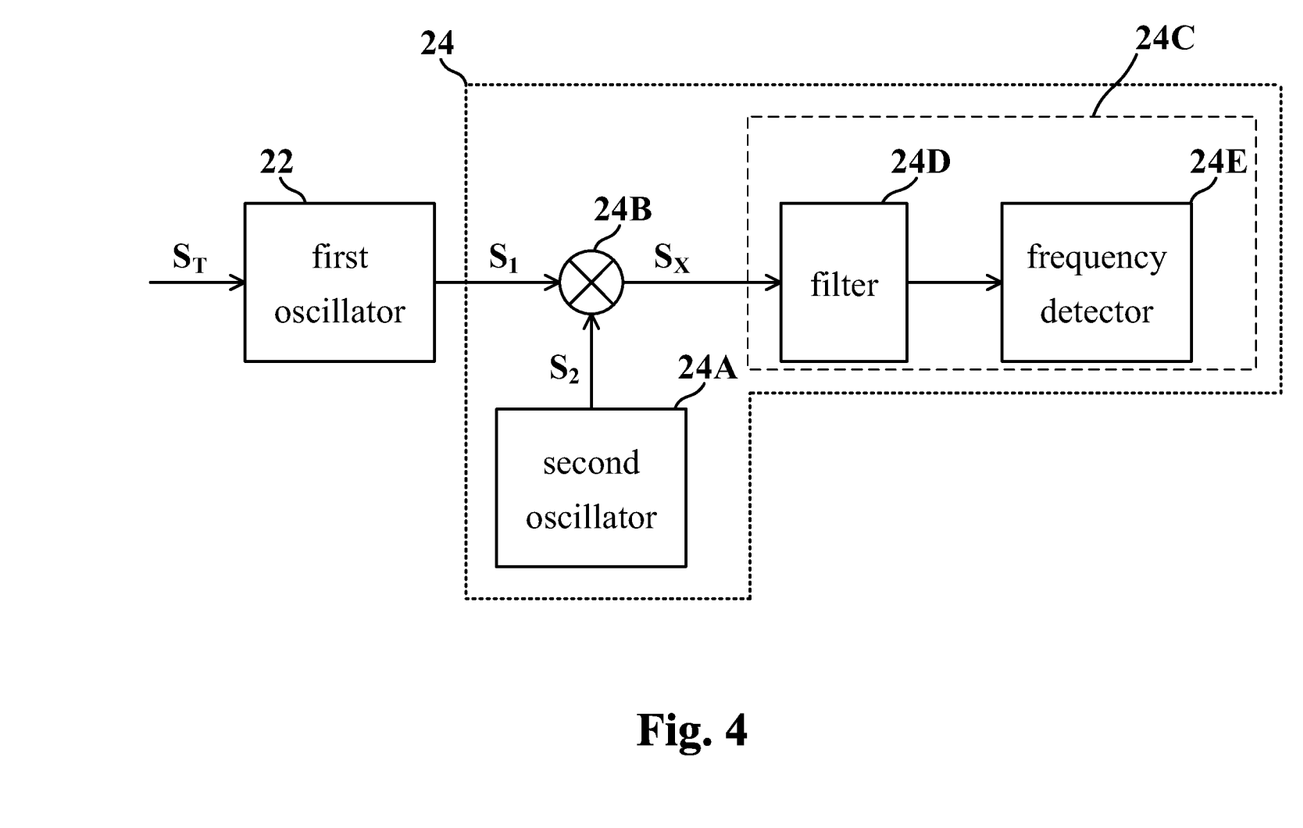

In practical applications, as shown in FIG. 4, the determining unit 24C comprises a filter 24D and a frequency detector 24E. The filter 24D filters the mixed signal $S_X$ to generate a filtered signal. The frequency detector 24E detects a frequency of the filtered signal, and determines that the first oscillating signal $S_1$ has the first frequency $\omega_{inj}$ or the second frequency $\omega_0$ accordingly.

Taking the foregoing situation that the second oscillating signal $S_2$ has the first frequency $\omega_{inj}$ as an example, the filter 24D is a low-pass filter for removing signals having frequencies higher than ($\omega_{inj}-\omega_0$). When the first oscillating signal $S_1$ has the first frequency $\omega_{inj}$, the filter 24D removes the signals having the frequencies of $\omega_{inj}$ and 2 $\omega_{inj}$ of the mixed signal $S_X$, and only transmits the DC signal of the mixed signal $S_X$ to the frequency detector 24E. When it is determined that the frequency of the filtered signal is approximately equal to zero, the frequency detector 24E determines the first oscillating signal $S_1$ has the first frequency $\omega_{inj}$.

Relatively, when the first oscillating signal $S_1$ has the second frequency $\omega_0$, the filter 24D removes the signals having the frequencies of $\omega_0$, and ($\omega_{inj}-\omega_0$), and only transmits the signal having the frequency of ($\omega_{inj}-\omega_0$) to the frequency detector 24E. When the frequency detector 24E detects that the frequency of the filtered signal is approximately equal to ($\omega_{inj}-\omega_0$), the frequency detector 24E detects that the first oscillating signal $S_1$ has the second frequency $\omega_0$.

Figure 5:
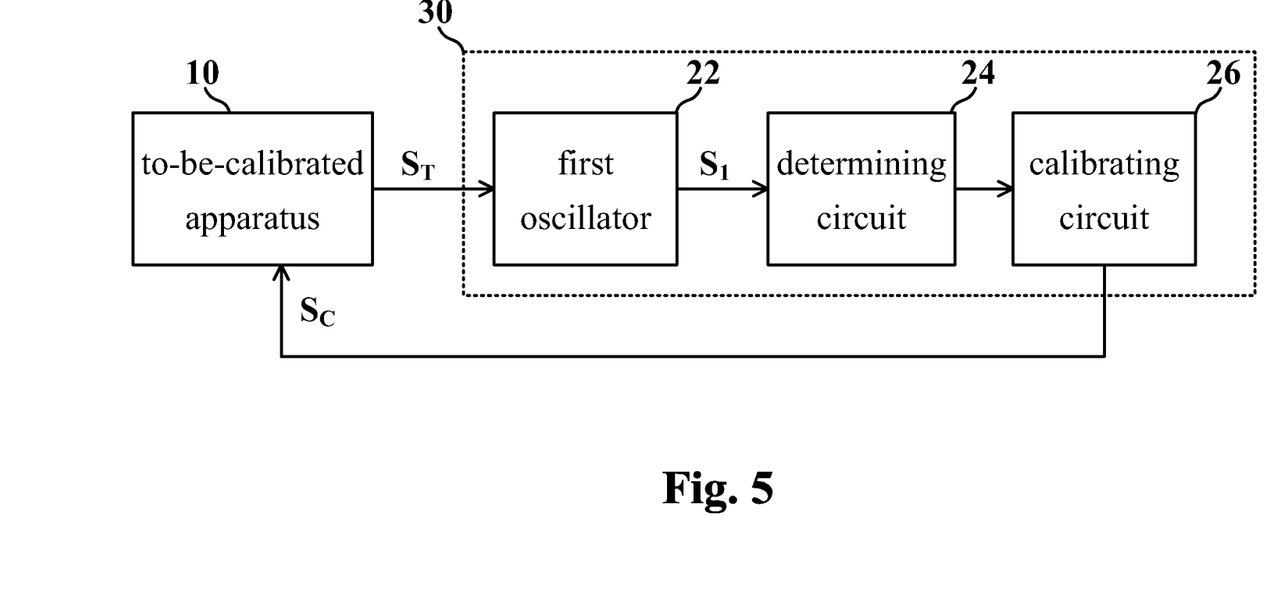
FIG. 5 is a block diagram of an apparatus for determining signal power in accordance with a second embodiment of the present invention.

Refer to FIG. 5 showing an apparatus for determining signal power in accordance with a second embodiment of the present invention. In this embodiment, the apparatus is applied to calibrate an output signal of a to-be-calibrated apparatus. Compared to the apparatus 20 in FIG. 2, an apparatus 30 in this embodiment further comprises a calibrating circuit 26. Functions of the first oscillator 22 and the determining circuit 24 in this embodiment are identical to those of the first embodiment. The calibrating circuit 26 generates a calibration signal $S_C$ according to a detection result of the determining circuit 24, and transmits the calibration signal $S_C$ to a to-be-calibrated apparatus 10 which provides the signal $S_T$.

For example, the to-be-calibrated apparatus 10 can be the signal transmitter as shown in FIG. 1. The apparatus 30 for determining signal power can be applied to respectively calibrate carrier leakage signals created by the in-phase path I and the quadrature-phase path Q at the output end of the signal transmitter. In other words, the signal $S_T$ in this embodiment is the carrier leakage signal at the output end of the signal transmitter.

As mentioned above, parameters of the quality factor Q, the current amount $I_o$ and the free running frequency $\omega_0$ of the first oscillator 22 are determined according to the power upper limit of the carrier leakage signal defined in the communication specifications conformed to by the signal transmitter, and the frequency $\omega_{inj}$ of the carrier leakage signal. For example, the first oscillator 22 is designed as entering the injection locking status when the signal power of the carrier leakage signal $S_T$ is higher than −36 dBm.

When the determining circuit 24 determines that the signal power of the carrier leakage signal is large enough to let the oscillator oscillate at the frequency of the carrier leakage signal, the calibrating circuit 26 correspondingly adjusts the calibration signal $S_C$ provided to the signal transmitter, e.g., the calibrating circuit 26 fine-tunes a compensation signal of the DC voltage of the path I/Q. Until the signal power of the carrier leakage signal is calibrated to let the first oscillator oscillate at the free running frequency, the calibrating circuit 26 stops adjusting the calibration signal $S_C$.

Figure 6:
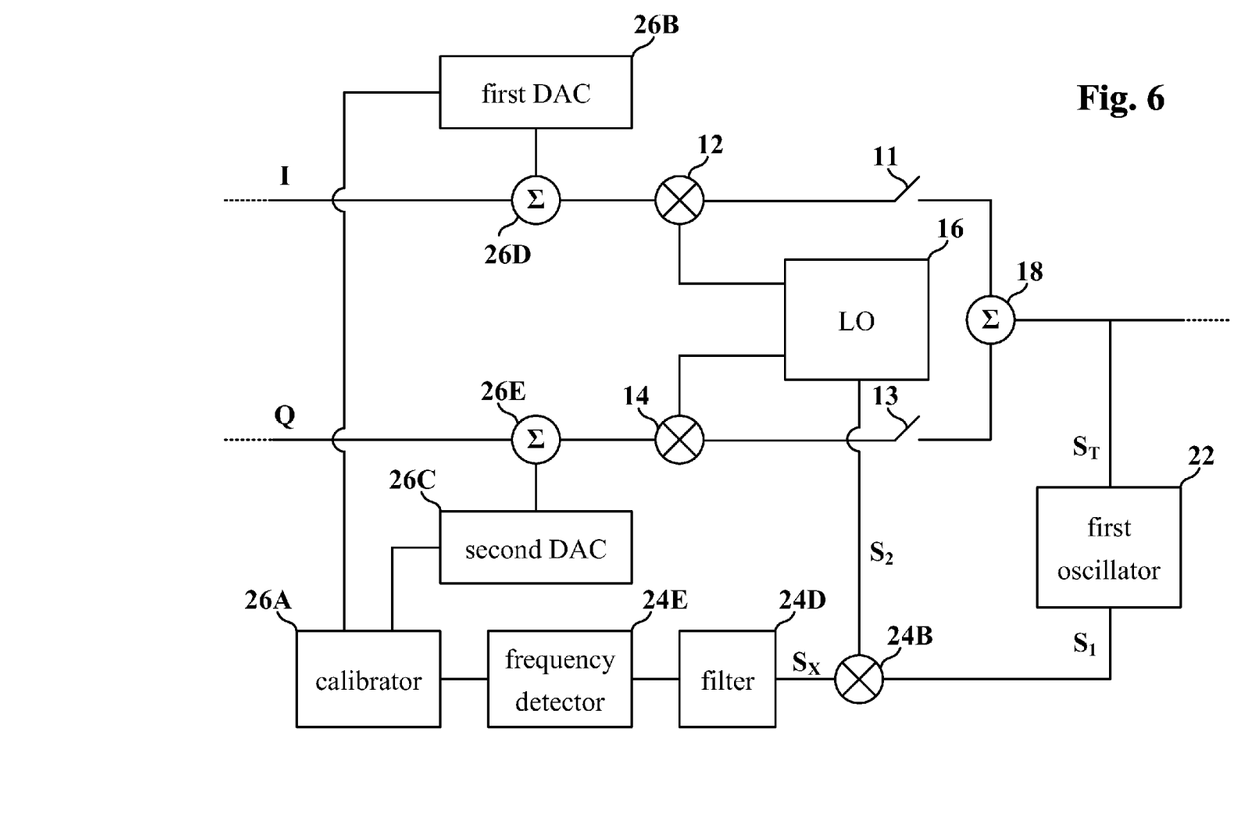
FIG. 6 is a schematic diagram of details of the apparatus for determining signal power in accordance with the second embodiment of the present invention.

FIG. 6 shows a schematic diagram of details of the apparatus for determining signal power in FIG. 5. The second oscillator 24A of the apparatus 30 can be implemented by the local oscillator 16 of the signal transmitter. In practical applications, when the circuit system simultaneously comprises a signal receiver in addition to the signal transmitter, the apparatus 30 can share mixers and oscillators with the signal receiver. In other words, the mixer 24B and the first oscillator 22 are implemented by existing mixers and oscillators of the signal receiver. In addition, the free running frequency of the first oscillator 22 is designed as being adjustable.

The calibrating circuit 26 comprises a calibrator 26A, a first digital-to-analog converter (DAC) 26B, a second DAC 26C, and two adders 26D and 26E in paths I and Q, respectively. When the in-phase signal path I is calibrated, the switch 13 for connecting the quadrature-phase signal path Q to the adder 18 is set open. In contrast, when the quadrature-phase signal path Q is calibrated, the switch 11 for connecting the in-phase signal path I to the adder 18 is set open.

Since the carrier leakage signal $S_T$ is created by the local oscillator, the frequency $\omega_{inj}$ of the carrier leakage signal $S_T$ identical to an oscillating frequency of the local oscillator 16 is known. As seen from FIG. 6, the mixer 24B respectively receives the oscillating signal $S_1$ from the first oscillator 22, and the oscillating signal $S_2$ from the local oscillator 16. When the signal power of the carrier leakage signal $S_T$ is large enough to let the first oscillator oscillate at the frequency $\omega_{inj}$ of the carrier leakage signal $S_T$, the mixed signal $S_X$ outputted by the mixer 24B comprises signals of two different frequencies of $\omega_{inj}$ and 2 $\omega_{inj}$, and a DC signal.

As mentioned above, when the filter 24D is a low-pass filter for removing signals having frequencies higher than ($\omega_{inj}-\omega_0$), under the situation that the first oscillator 22 oscillates at the frequency $\omega_{inj}$, the filter 24D only allows the DC signal of the mixed signal $S_X$ to be transmitted to the frequency detector 24E. Upon determining that a frequency of the filtered signal is approximately equal to zero, the frequency detector 24E determines that the first oscillating signal $S_1$ has the first frequency $\omega_{inj}$. The calibrator 26A requests the first DAC 26B and the second DAC 26C to adjust compensation signals of the DC voltages provided to the paths I and Q.

An output voltage of the first DAC 26B is added to the DC voltage of the in-phase signal path I by the adder 26D, and an output voltage of the second DAC 26C is added to the DC voltage of the quadrature-phase signal path Q by the adder 26E, so as to compensate circuit un-ideal factors of the signal transmitter, thereby reducing the signal power of the carrier leakage signal $S_T$. The calibrator 26A respectively adjusts the output voltages of the first DAC 26B and the second DAC 26C until injection locking does not occur due to the signal power of the carrier leakage signal $S_T$ created by the paths I and Q.

In practical applications, the first DAC 26B and the second DAC 26C are designed to provide various predetermined compensation voltages, e.g., 64 predetermined compensation voltages ranging from −32 unit voltage to +31 unit voltage. The calibrator 26A selects a compensation voltage as a calibration signal from the predetermined compensation voltages according to the output result of the frequency detector 24E.

Figure 7:
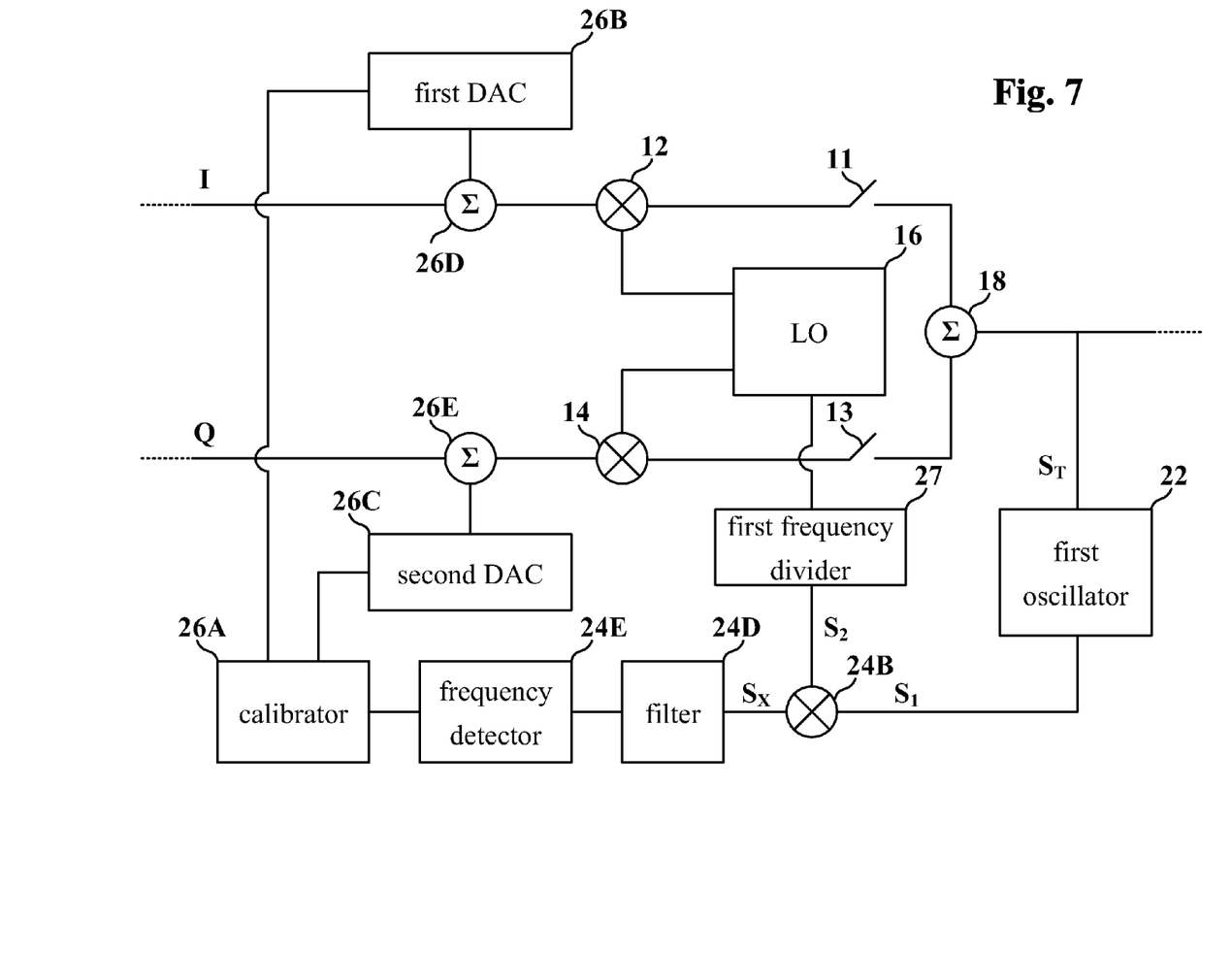
FIG. 7 is a block diagram of an apparatus for determining signal power in accordance with a third embodiment of the present invention.

FIG. 7 shows a schematic diagram of an apparatus for determining signal power in accordance with a third embodiment of the present invention. In this embodiment, the first oscillator 22 is an injection-lock frequency divider (ILFD) having characteristics that, when the frequency $\omega_{inj}$ and the signal power of the to-be-detected signal $S_T$ are enough to incur the injection locking in the first oscillator 22, the frequency of the first oscillating signal $S_1$ generated by the first oscillator 22 is 1/N of the frequency $\omega_{inj}$ of the signal $S_T$, where N is an integer greater than 1. In contrast, when the injection locking does not occur in the first oscillator 22, the frequency of first oscillating signal $S_1$ is the free running frequency $\omega_0$.

Correspondingly, in this embodiment, a first frequency divider 27 coupled between the local oscillator 16 and the mixer 24B frequency divides the output signal of the local oscillator 16 by N. Therefore, when the injection locking occurs in the first oscillator 22, frequencies of the two oscillating signals $S_1$ and $S_2$ are ($\omega_{inj}/N$). Compared to the foregoing embodiments, the apparatus for determining signal power in this embodiment can also achieve the effect of detecting and reducing the carrier leakage signal of the signal transmitter.

Figure 8:
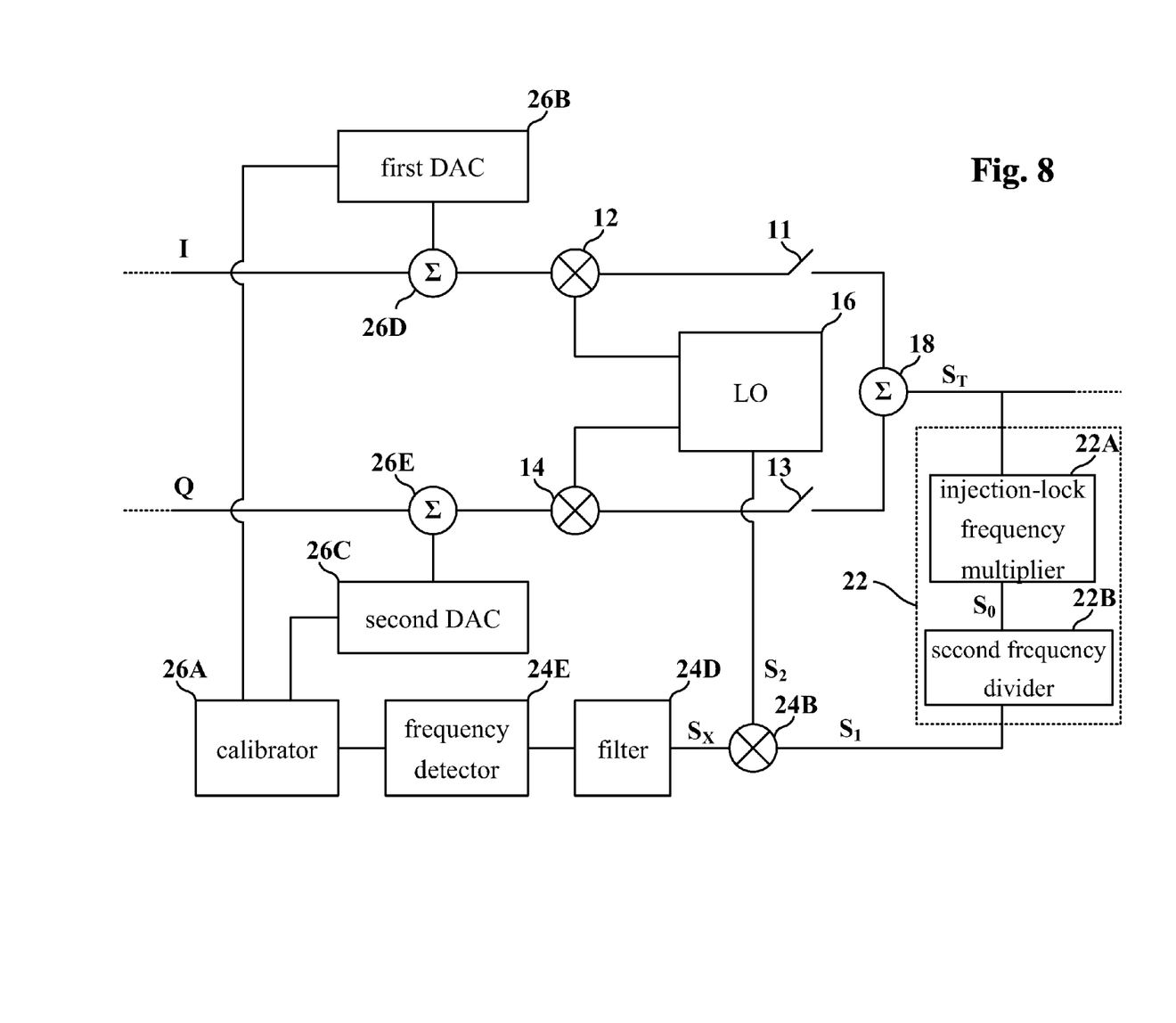
FIG. 8 is a block diagram of an apparatus for determining signal power in accordance with a fourth embodiment of the present invention.

FIG. 8 is a schematic diagram of an apparatus for determining signal power in accordance with a fourth embodiment of the present invention. In this embodiment, the first oscillator 22 comprises an injection-lock frequency multiplier 22A (e.g., a harmonic injection-lock circuit) having characteristics that, when the frequency $\omega_{inj}$ and the signal power of the signal $S_T$ are enough to incur the injection locking in the injection-lock frequency multiplier 22A, a frequency of a frequency-multiplied signal $S_O$ generated by the injection-lock frequency multiplier 22A is N multiples of the frequency $\omega_{inj}$ of the signal $S_T$, where N is an integer greater than 1. In contrast, when the injection locking does not occur in the first oscillator 22, the frequency of frequency-multiplied signal $S_O$ is the free running frequency $\omega_0$.

Referring to FIG. 8, the first oscillator 22 in this embodiment further comprises a second frequency divider 22B for frequency dividing the frequency-multiplied signal $S_O$ by N. Therefore, when the injection locking occurs in the injection-lock frequency multiplier 22A, the frequencies of the two oscillating signals $S_1$ and $S_2$ received by the mixer 24B still are $\omega_{inj}$. Compared to the foregoing embodiments, the apparatus for determining signal power in this embodiment can also achieve the effect of detecting and reducing the carrier leakage signal of the signal transmitter.

Figure 9:
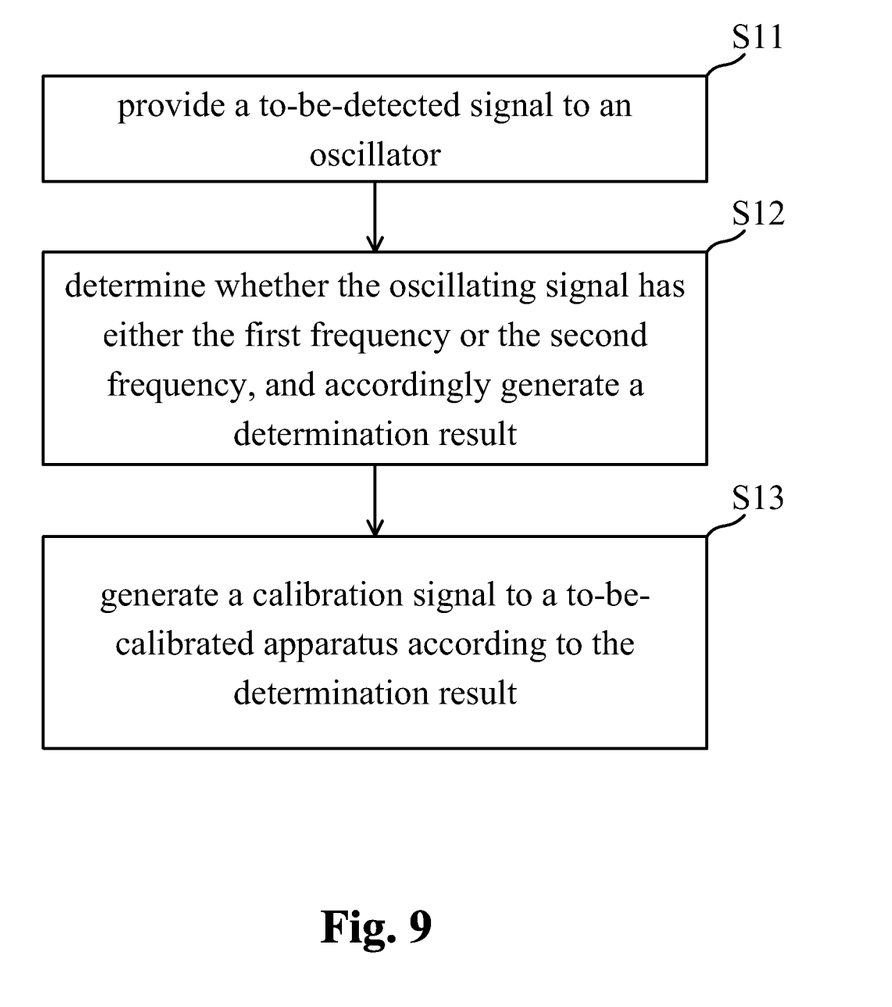
FIG. 9 is a flow chart of a method for determining signal power in accordance with a fifth embodiment of the present invention.

FIG. 9 is a flow chart of a method for determining signal power in accordance with a fifth embodiment of the present invention. The method begins with Step S11 in which a to-be-detected signal is provided to an oscillator. Characteristics of the oscillator is that, when signal power of the to-be-detected signal is greater than a threshold, an oscillating signal generated by the oscillator has a first frequency; when the signal power of the to-be-detected signal is smaller than the threshold, the oscillating signal generated by the oscillator has a second frequency.

In Step S12, it is determined whether the oscillating signal has either the first frequency or the second frequency, and a determination result is generated accordingly. In Step S13, a calibration signal is generated according to the determination result, and calibration signal is transmitted to a to-be-calibrated apparatus which provides the to-be-detected signal.

As mentioned in the foregoing embodiments of the signal transmitter, the calibrator 26A according to the present invention selects a calibration signal from a plurality of predetermined compensation voltages. In practical applications, the calibrator 26A tries the plurality of compensation voltages one after another, e.g., 64 predetermined compensation voltages within a range from −32 unit voltage to +32 unit voltage are respectively provided one after another from low to high to the two paths of the signal transmitter until the signal power of the carrier leakage signal $S_T$ of the paths I and Q cannot incur the injection locking in the first oscillator 22.

Figure 10:
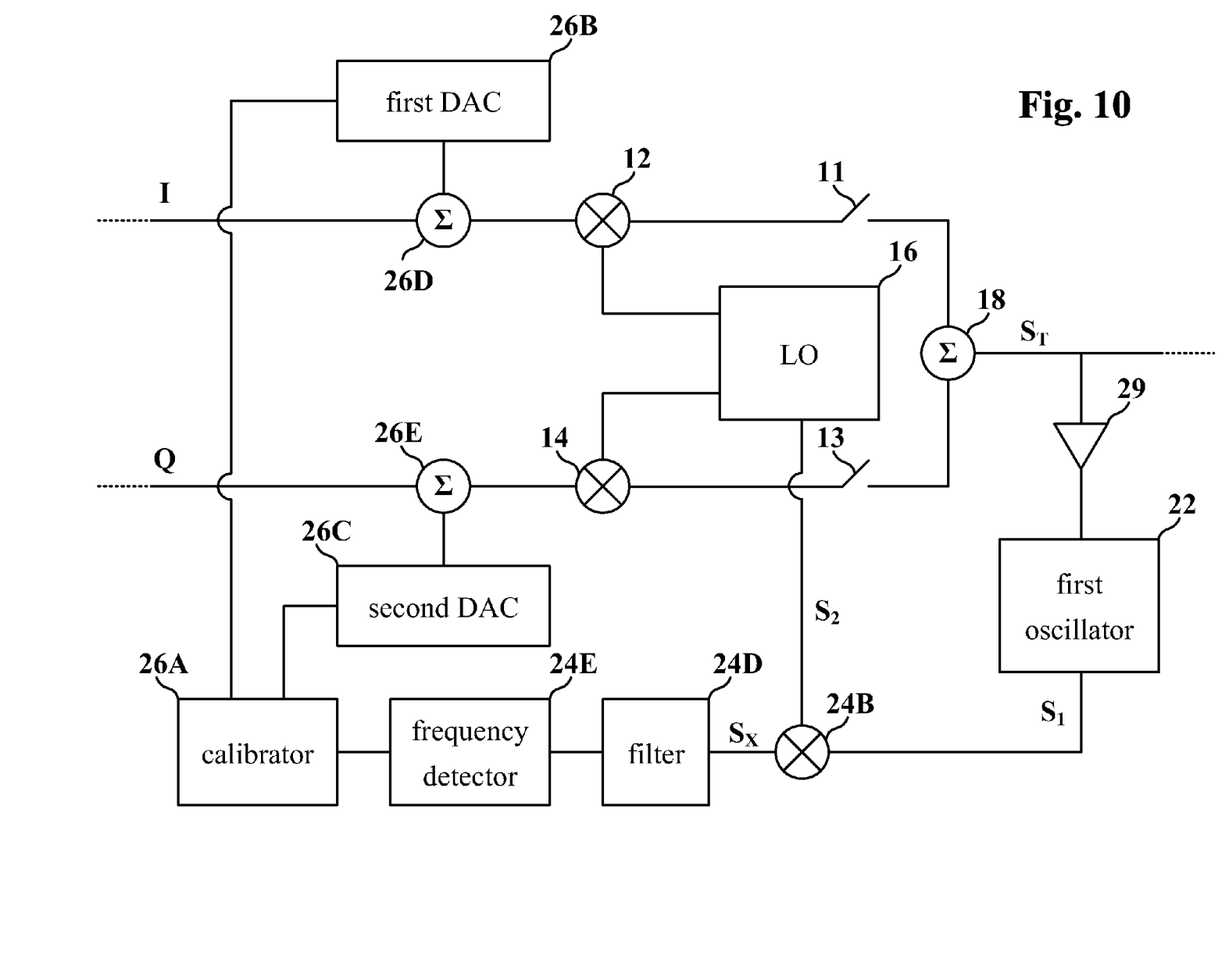
FIG. 10 is a block diagram of an apparatus for determining signal power in accordance with a sixth embodiment of the present invention.
Figure 11:
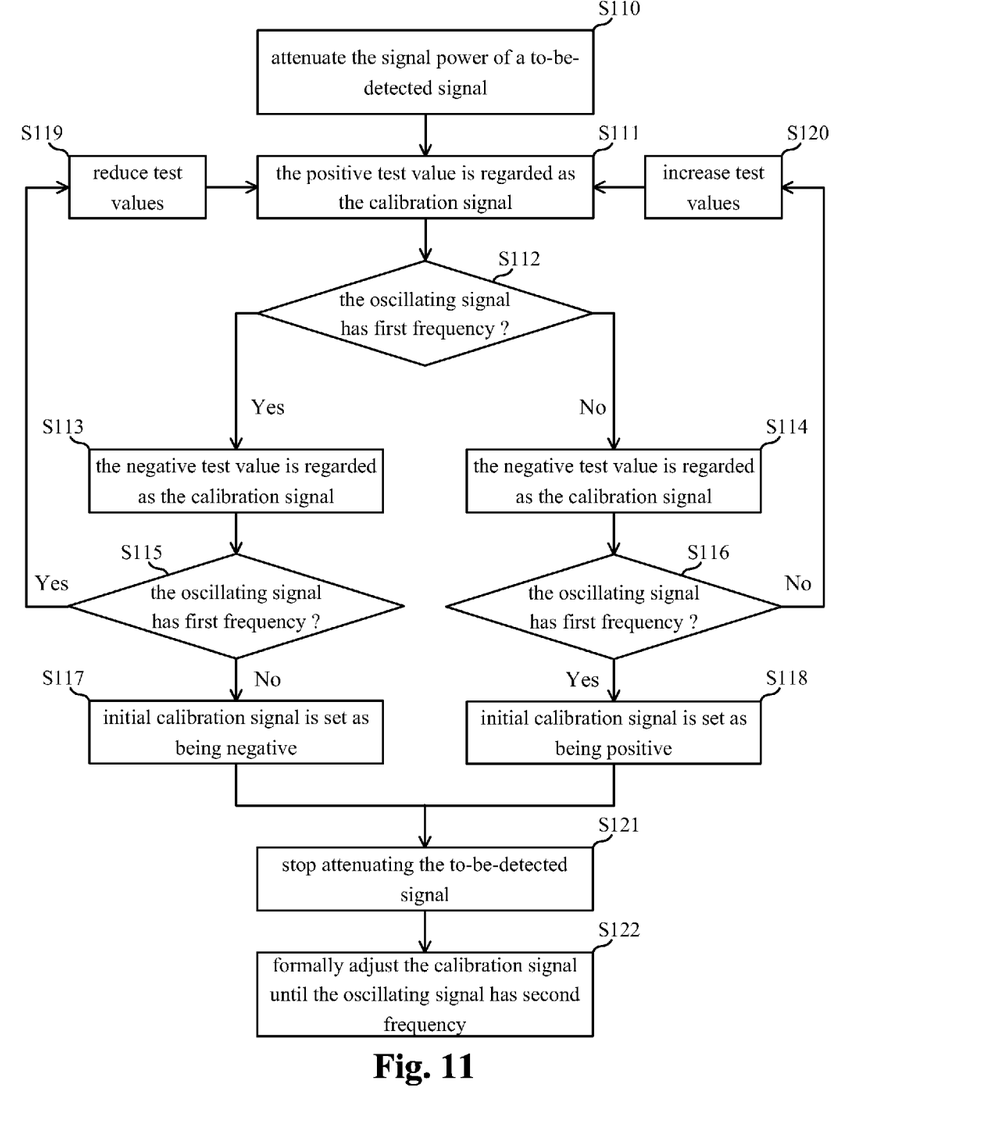
FIG. 11 is a flow chart of an approach for determining a positive/negative sine of a calibration signal in accordance with an embodiment of the present invention.

FIG. 10 shows an apparatus for determining signal power in accordance with a sixth embodiment of the present invention. In this embodiment, an attenuator 29 is coupled between the output end of the signal transmitter and the first oscillator 22. In other words, the to-be-detected signal $S_T$ is first attenuated by the attenuator 29 before entering the first oscillator 22. By using a method for determining signal power as shown in FIG. 11, the attenuator 29 further improves efficiency of calibrating the signal transmitter (or other to-be-calibrated calibrating apparatuses) by the apparatus for determining signal power according to the present invention.

In order to accelerate a calibration speed, a method for determining signal power according to the present invention first determines positive/negative signs of a calibration signal before formal calibration, so as to reduce a time for trying the voltages one after another. FIG. 11 shows a flow chart of an approach for determining a positive/negative sine of a calibration signal in accordance with an embodiment of the present invention. The method begins with Step S110 in which signal power of a to-be-detected signal is attenuated, such that an oscillating signal has a second frequency.

Taking circuits in FIG. 10 as an example, before any calibration signal is provided, the signal power of the to-be-detected signal $S_T$ may prompt the first oscillator 22 to enter an injection-lock status and to oscillate at a first frequency. In Step S110, an attenuation amount is provided by the attenuator 29 to reduce the signal power of the signal $S_T$, such that the first oscillator 22 stops the injection-lock status and changes to oscillate at the second frequency (i.e., the free running frequency of the first oscillator 22). In Step S110 of this embodiment, the attenuator 29 attenuates the signal power of the signal $S_T$ to an amount for the first oscillator 22 exactly stopping the injection-lock status. In other words, after Step S110, the first oscillator is approximately at an edge of injection-lock status and non-injection-lock status.

In this embodiment, a positive test value and a negative test value are respectively regarded as the calibration signal, and it is determined which one of the two may prompt the first oscillator 22 to enter the injection-lock status. For example, the positive test value and the negative test value are respectively +16 unit voltage and −16 unit voltage. Referring to FIG. 11, in Step S111, the positive test value is regarded as the calibration signal. In Step S112, it is determined that whether an adjusted signal $S_T$ can prompt the first oscillator 22 to enter the injection-lock status and to oscillate at the first frequency after the positive test value is provided to the to-be-calibrated apparatus. When the determination result of Step S112 is positive, the method proceeds to Step S113 in which the negative test value is regarded as the calibration signal instead.

In Step S115, it is determined whether the first oscillator 22 enters the injection-lock status and oscillates at the first frequency after the negative value is provided to the to-be-calibrated apparatus. When the determination result of Step S115 is negative, the method proceeds to Step S117 in which a formal initial calibration signal for subsequently calibrating the to-be-calibrated apparatus is set as being negative. More specifically, since the first oscillator 22 enters the injection-lock status when the positive test value is regarded as the calibration signal but the first oscillator 22 does not enter the injection-lock status when the negative test value is regards as the calibration signal, it means that the negative calibration signal reduces the signal power of the signal $S_T$ more effectively. Therefore, once the first oscillator 22 enters the injection-lock status when the positive test value is regarded as the calibration signal but the first oscillator 22 does not enter the injection-lock status when the negative test value is regards as the calibration signal, the negative calibration signal is adopted in this embodiment.

After Step S117 of determining to adopt the negative initial calibration signal, the method proceeds to Step S121 and Step S122, i.e., attenuation is no longer applied to the to-be-detected signal and the calibration signal begins to be formally adjusted until the calibration signal is capable of preventing the first oscillator 22 from the injection-lock status. The so-called adoption of the negative initial calibration signal means that, when the calibration signal begins to be formally adjusted, the calibrator 26A adopts one of the 32 predetermined compensation voltages between −32 unit voltage to −1 unit voltage and directly omits other 32 predetermined compensation voltages between 0 unit voltage to +31 unit voltage.

In contrast, when the determination result in Step S112 indicates that the first oscillator unit 22 does not enter the injection-lock status when the positive test value is regarded as the calibration signal (i.e., adjusted signal $S_T$ does not cause the first oscillator 22 to enter injection-lock status and oscillate at the first frequency when applying the positive test value to the to-be-calibrated apparatus), the method proceeds to Step S114 and Step S116, i.e., the negative test value is regarded as the calibration signal instead, and it is determined whether the negative test value prompts the first oscillator 22 to enter the injection-lock status. When the determination result indicates that the first oscillator 22 enters the injection-lock status when the negative test value is regarded as the calibration signal, it means that the positive calibration signal can reduce the signal power of the signal $S_T$ more effectively. Therefore, when the determination result of Step S116 is positive, the method proceeds to Step S118 in which the positive calibration signal is adopted.

After Step S118 of determining to adopt the positive initial calibration signal, the method proceeds to Step S121 and Step S122, i.e., attenuation is no longer applied to the to-be-detected signal and the calibration signal begins to be formally adjusted until the calibration signal is capable of preventing the first oscillator 22 from the injection-lock status. The so-called adoption of the negative initial calibration signal means that, when the calibration signal begins to be formally adjusted, the calibrator 26A adopts one of the 32 predetermined compensation voltages between 0 unit voltage to +31 unit voltage and directly omits other 32 predetermined compensation voltages between −32 unit voltage to −1 unit voltage.

Referring to FIG. 11, when the determination results of Step S112 and Step S115 are positive, i.e., when the first oscillator 22 enters the injection-lock status regardless of using either the current positive test value or the negative test value, the method proceeds to Step S119 in which absolute values of the positive test value and the negative test value are simultaneously reduced (e.g., the positive test value and the negative test value are respectively changed to +8 unit voltage and −8 unit voltage). After Step S119 is completed, the method again proceeds to Step S111 and subsequent steps.

In contrast, when the determination results of Step S112 and Step 116 are negative, i.e., when the first oscillator 22 does not enter the injection-lock status regardless of using either the current positive test value or the negative test value, the method proceeds to Step S120 in which the absolute values of the positive test value and the negative test value are simultaneously increased (e.g., the positive test value and the negative test value are respectively changed to +32 unit voltage and −32 unit voltage). After Step S120 is completed, the method again proceeds to Step S111 and subsequent steps.

As mentioned above, in Step S111 to Step S120, a positive test value and a negative test value are respectively regarded as the calibration signal, and an initial calibration signal is determined according to determination results corresponding to the two test values. By determining positive/negative signs of the calibration signal in advance, a process of testing some predetermined compensation voltages is reduced, and accordingly a method and an apparatus for determining signal power are capable of effectively reducing a time for determining a proper calibration signal.

In conclusion, an apparatus and a method for determining signal power according to the present invention adopts a frequency, not a voltage as a comparison reference to avoid determination result inaccuracy created by numerous un-ideal factors of circuits, and are also widely applied to all types of fields needing to detect signal power on top of a carrier leakage calibration circuit of a signal transmitter.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for determining signal power of a to-be-detected signal, comprising:
   a first oscillator, for generating a first oscillating signal, with the first oscillating signal having a first frequency when the signal power of the to-be-detected signal is greater than a threshold, and the first oscillating signal having a second frequency when the signal power of the to-be-detected signal is smaller than the threshold; and
   a determining circuit, for determining whether the first oscillating signal has either the first frequency or the second frequency, and generating a determination result accordingly.

2. The apparatus for determining signal power as claimed in claim 1, wherein the determining circuit comprises:
   a second oscillator, for providing a second oscillating signal;
   a mixer, for mixing the first oscillating signal and the second oscillating signal to generate a mixed signal; and
   a determining unit, for determining whether the first oscillating signal has either the first frequency or the second frequency according to the mixed signal.

3. The apparatus for determining signal power as claimed in claim 2, wherein the second oscillating signal has the first frequency, and the determining unit determines that the first oscillating signal has the first frequency when the mixed signal comprises a direct current (DC) signal.

4. The apparatus for determining signal power as claimed in claim 2, wherein the determining unit comprises:
   a filter, for filtering the mixed signal to generate a filtered signal; and
   a frequency detector, for detecting a frequency of the filtered signal, and determines that the first oscillating signal has the either the first frequency or the second frequency according to the filtered signal.

5. The apparatus for determining signal power as claimed in claim 1, further comprising:
   a calibrating circuit, for generating a calibration signal according to the determination result and transmits the calibration signal to a to-be-calibrated apparatus for providing the to-be-detected signal.

6. The apparatus for determining signal power as claimed in claim 5, wherein the to-be-calibrated apparatus is a signal transmitter, the to-be-detected signal is a carrier leakage signal, and the calibration signal is for calibrating an input voltage of the signal transmitter.

7. The apparatus for determining signal power as claimed in claim 5, wherein when the determination result indicates that the first oscillating signal has the first frequency, the calibrating circuit adjusts the calibration signal, and when the determination result indicates that the first oscillating signal has the second frequency, the calibrating circuit stops adjusting the calibration signal.

8. The apparatus for determining signal power as claimed in claim 7, wherein the calibrating circuit selects one of a plurality of compensation voltages as the calibration signal when the determination result indicates that the first oscillating signal has the first frequency, and selects another one from the compensation voltages as the calibration signal when the determination result indicates that the first oscillating signal has the second frequency.

9. The apparatus for determining signal power as claimed in claim 1, further comprising:
an attenuator, for processing the to-be-detected signal before the to-be-detected signal is inputted to the first oscillator.

10. The apparatus for determining signal power as claimed in claim 1, wherein the second frequency is determined according to the first frequency and a signal power upper limit of the to-be-detected signal.

11. The apparatus for determining signal power as claimed in claim 1, wherein the to-be-detected signal has the first frequency, and the second frequency is a free running frequency of the first oscillator.

12. The apparatus for determining signal power as claimed in claim 1, wherein the to-be-detected signal has a third frequency, and the first frequency is 1/N of the third frequency, where N is an integer greater than 1.

13. The apparatus for determining signal power as claimed in claim 1, wherein the to-be-detected signal has the first frequency, and the first oscillator comprises:
an injection-lock frequency multiplier, for generating a frequency-multiplied signal having a frequency that is N times the first frequency when the signal power is greater than the threshold, and the frequency-multiplied signal having a frequency that is N times the second frequency when the signal power is smaller than the threshold, where N is an integer greater than one; and
a frequency divider, for frequency dividing the frequency-multiplied signal by N to generate the first oscillating signal.

14. A method for determining signal power of a to-be-detected signal, comprising:

(a) providing the to-be-detected signal to an oscillator for generating an oscillating signal, with the oscillating signal having a first frequency when the signal power of the to-be-detected signal is greater than a threshold, and the oscillating signal having a second frequency when the signal power is smaller than the threshold; and
(b) determining whether the oscillating signal has either the first frequency or the second frequency, and generating a determination result accordingly.

15. The method as claimed in claim 14, further comprising:
generating a calibration signal according to the determination result, and transmitting the calibration signal to a to-be-calibrated apparatus for providing the to-be-detected signal.

16. The method as claimed in claim 15, further comprising:
attenuating the signal power of the to-be-detected signal to prompt the oscillating signal has the second frequency;
determining a positive test value and a negative test value, and respectively regarding the positive test value and the negative test value as the calibration signal that is provided to the to-be-calibrated apparatus;
determining a first determination result using the positive test value as the calibration signal, and determining a second determination result using the negative test value as the calibration signal; and
determining an initial calibration signal according to the first determination result and the second determination result.

17. The method as claimed in claim 16, wherein when the first determination result indicates that the oscillating signal has the second frequency, and the second determination result indicates that the oscillating signal has the first frequency, the initial calibration signal is a positive calibration signal.

18. The method as claimed in claim 16, wherein when the first determination result indicates that the oscillating signal has the first frequency, and the second determination indicates that the oscillating signal has the second frequency, the initial calibration signal is a negative calibration signal.

* * * * *